(12) United States Patent
Heishi et al.

(10) Patent No.: US 9,812,735 B2
(45) Date of Patent: Nov. 7, 2017

(54) LITHIUM ION SECONDARY BATTERY

(71) Applicants: SEKISUI CHEMICAL CO., LTD., Osaka (JP); NEC CORPORATION, Tokyo (JP)

(72) Inventors: Masaru Heishi, Tsukuba (JP); Takuya Toyokawa, Tsukuba (JP); Katsumi Maeda, Tokyo (JP); Noriyuki Tamura, Tokyo (JP); Kentaro Nakahara, Tokyo (JP)

(73) Assignees: SEKISUI CHEMICAL CO., LTD., Osaka (JP); NEC CORPORATION, Tokyo (JP)

( * ) Notice: Subject to any disclaimer, the term of this patent is extended or adjusted under 35 U.S.C. 154(b) by 66 days.

(21) Appl. No.: 14/772,595

(22) PCT Filed: Aug. 20, 2014

(86) PCT No.: PCT/JP2014/071747
§ 371 (c)(1),
(2) Date: Sep. 3, 2015

(87) PCT Pub. No.: WO2015/025877
PCT Pub. Date: Feb. 26, 2015

(65) Prior Publication Data
US 2016/0028119 A1    Jan. 28, 2016

(30) Foreign Application Priority Data

Aug. 21, 2013 (JP) .................................. 2013-171606

(51) Int. Cl.
*H01M 10/05* (2010.01)
*H01M 4/50* (2010.01)
(Continued)

(52) U.S. Cl.
CPC ....... *H01M 10/0567* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS 6,352,794 B1     3/2002  Nakanishi et al.
2010/0248032 A1*  9/2010  Pitteloud ............ C01G 45/1228
                                                          429/221
(Continued)

FOREIGN PATENT DOCUMENTS

JP   H11-26015 A      1/1999
JP   2000-195516 A    7/2000
(Continued)

OTHER PUBLICATIONS

International Search Report issued with respect to application No. PCT/JP2014/071747, dated Oct. 28, 2014.

*Primary Examiner* — Scott J Chmielecki
(74) *Attorney, Agent, or Firm* — Greenblum & Bernstein, P.L.C.

(57) ABSTRACT

A lithium ion secondary battery comprising: a positive electrode comprising a positive electrode active material; a negative electrode comprised mainly of a material capable of storing and releasing lithium ions; and an electrolytic liquid, the positive electrode active material being a lithium-iron-manganese complex oxide having a layered rock salt structure and represented by a chemical formula:

$$Li_xFe_sM^1_{(z-s)}M^2_yO_{2-\delta}$$

(Continued)

wherein $1.05 \leq x \leq 1.32$, $0.06 \leq s \leq 0.50$, $0.06 \leq z \leq 0.50$, $0.33 \leq y \leq 0.63$, and $0 \leq \delta \leq 0.80$; $M^1$ represents a metal selected from the group consisting of Co, Ni, Mn and a mixture thereof; and $M^2$ represents a metal selected from the group consisting of Mn, Ti, Zr and a mixture thereof, the electrolytic liquid comprising 1,1,2,3,3,3-hexafluoropropyl difluoromethyl ether represented by the following formula (1):

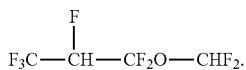

(1)

6 Claims, 1 Drawing Sheet

(51) Int. Cl.
*H01M 10/0567* (2010.01)
*H01M 4/505* (2010.01)
*H01M 4/525* (2010.01)
*H01M 10/052* (2010.01)
*H01M 10/0569* (2010.01)
*H01M 10/0525* (2010.01)

(52) U.S. Cl.
CPC ..... *H01M 10/052* (2013.01); *H01M 10/0525* (2013.01); *H01M 10/0569* (2013.01); *H01M 2300/0025* (2013.01); *Y02T 10/7011* (2013.01)

(56) References Cited

U.S. PATENT DOCUMENTS

| | | | |
|---|---|---|---|
| 2011/0076572 A1* | 3/2011 | Amine | H01M 10/05 429/328 |
| 2013/0266847 A1 | 10/2013 | Noguchi et al. | |
| 2014/0023935 A1* | 1/2014 | Noguchi | H01M 4/505 429/333 |
| 2014/0087265 A1* | 3/2014 | Yura | H01M 4/131 429/231.1 |
| 2015/0194671 A1* | 7/2015 | Nakahara | H01M 4/0438 429/221 |

FOREIGN PATENT DOCUMENTS

| | | |
|---|---|---|
| JP | 2006-036621 A | 2/2006 |
| JP | 2013-026180 A | 2/2013 |
| JP | 2013-100197 A | 5/2013 |
| WO | 2009/041722 A | 4/2009 |
| WO | 2012/077712 A | 6/2012 |
| WO | WO 2012077712 A1 * | 6/2012 ........ H01M 10/0525 |
| WO | 2012/141301 A | 10/2012 |

\* cited by examiner

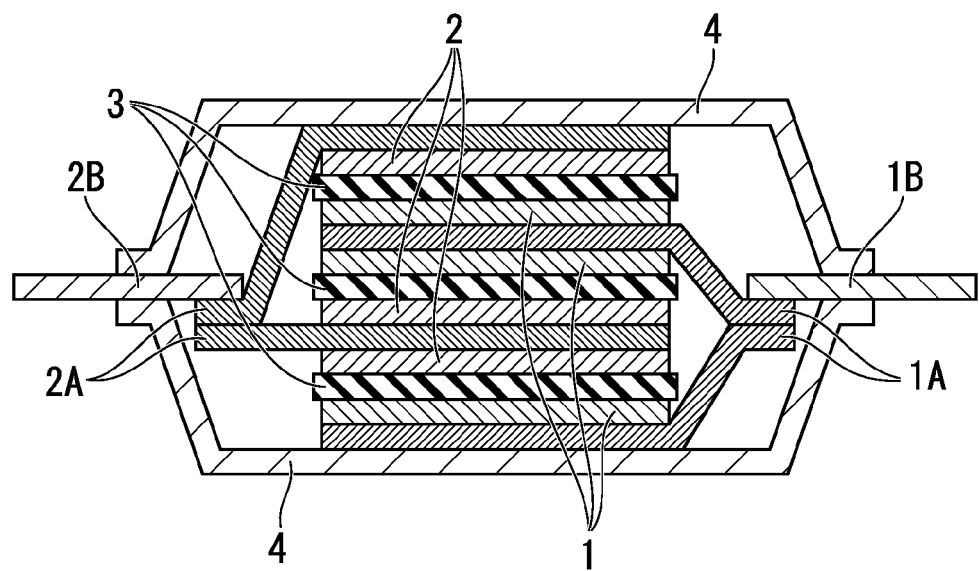

LITHIUM ION SECONDARY BATTERY

TECHNICAL FIELD

The present invention relates to a lithium ion secondary battery.

Priority is claimed on Japanese Patent Application No. 2013-171606, filed Aug. 21, 2013, the contents of which are incorporated herein by reference.

BACKGROUND ART

With the rapid expansion of the market for laptop computers, mobile phones and electric vehicles, demand for secondary batteries with high energy density is growing. The means for providing secondary batteries with high energy density that are currently being developed include, for example, a method using a negative electrode material having a large capacity, and a method using a positive electrode having a high electrical potential. In many cases, the voltages of general lithium ion secondary batteries are in the range of from 3.5 to 4.2 V. However, lithium ion secondary batteries with positive electrode having a high electrical potential have a voltage of 4.5 V or more; therefore, it is expected that the energy density of such lithium ion secondary batteries will be improved. It is also conceivable that the use of such a positive electrode in combination with a negative electrode having a larger capacity will further enhance the increase of the capacity of the batteries.

However, the use of a positive electrode having a high electrical potential leads to a problem of deterioration of battery performance due to the decomposition of an electrolytic liquid. As a method for suppressing the decomposition of the electrolytic liquid, for example, Patent Document 1 discloses a method in which an aliphatic compound having 1-propenyloxy group or the like is added to the electrolytic liquid.

PRIOR ART REFERENCES

Patent Document

Patent Document 1: Japanese Unexamined Patent Application Publication No. 2013-26180

DISCLOSURE OF INVENTION

Problems to be Solved by the Invention

However, when the aliphatic compound disclosed in Patent Document 1 is used as an additive for a lithium ion secondary battery, a problem arises in that the secondary battery suffers a drastic decrease of capacity through the repetition of charge/discharge cycle.

The present invention has been made in view of the above situation, and the object of the present invention is to provide a lithium ion secondary battery which can suppress the capacity decrease occurring through the repetition of charge/discharge cycle as compared to the conventional batteries even when the working voltage is set at 4.5 V or higher, which is higher than the conventional working voltage, i.e., 3.5 to 4.2 V.

Means to Solve the Problems

The present inventors have paid attention to the use of a fluorine-containing ether compound to be added to an electrolytic liquid. When the battery performance was evaluated using the fluorine-containing ether compound used in conventional lithium ion secondary batteries (see, for example, Japanese Patent Application Unexamined Publication No. 11-26015) under more severe conditions than employed conventionally (charge/discharge cycle at 45° C. and 1.5V to 4.5V), satisfactory results could not be obtained.

The present inventors have advanced their extensive and intensive studies and found that, with respect to the fluorine-containing ether compound, when one of the two alkyl groups bonded to the oxygen atoms of the fluorine-containing ether compound has one carbon atom and the other has 3 to 8 carbon atoms, the fluorine-containing ether compound exhibits excellent solubility in a non-aqueous solvent, and when the number of fluorine atoms substituting the hydrogen atoms of the respective two alkyl groups is adjusted, a capacity decrease occurring through the repetition of charge/discharge cycle of a lithium ion secondary battery can be suppressed.

Further, the present inventors have found that the effect of the aforementioned fluorine-containing ether compound can be further enhanced by using, as a positive electrode active material of the lithium ion secondary battery, a lithium-iron-manganese complex oxide having a layered rock salt structure and represented by a chemical formula:

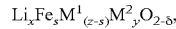

wherein $1.05 \leq x \leq 1.32$, $0.06 \leq s \leq 0.50$, $0.06 \leq z \leq 0.50$, $0.33 \leq y \leq 0.63$, and $0 \leq \delta \leq 0.80$; $M^1$ represents a metal selected from the group consisting of Co, Ni, Mn and a mixture thereof; and $M^2$ represents a metal selected from the group consisting of Mn, Ti, Zr and a mixture thereof. Specifically, the present invention provides the following measures.

[1] A lithium ion secondary battery comprising: a positive electrode including a positive electrode active material; a negative electrode comprised mainly of a material capable of storing and releasing lithium ions; and an electrolytic liquid, the positive electrode active material being a lithium-iron-manganese complex oxide having a layered rock salt structure and represented by a chemical formula:

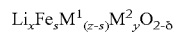

wherein $1.05 \leq x \leq 1.32$, $0.06 \leq s \leq 0.50$, $0.06 \leq z \leq 0.50$, $0.33 \leq y \leq 0.63$, and $0 \leq \delta \leq 0.80$; $M^1$ represents a metal selected from the group consisting of Co, Ni, Mn and a mixture thereof; and $M^2$ represents a metal selected from the group consisting of Mn, Ti, Zr and a mixture thereof, the electrolytic liquid including 1,1,2,3,3,3-hexafluoropropyl difluoromethyl ether represented by the following formula (1):

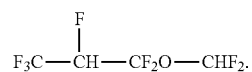

(1)

[2] The lithium ion secondary battery according to [1], wherein the main component of $M^1$ is Ni, and the main component of $M^2$ is Mn.
[3] The lithium ion secondary battery according to [1] or [2], wherein the material capable of storing and releasing lithium ions comprises at least one member selected from the group consisting of elemental silicon, silicon oxide and carbon.
[4] The lithium ion secondary battery according to any one of [1] to [3], wherein the electrolytic liquid further comprises at least one solvent selected from the group consisting of a linear carbonate solvent and a cyclic carbonate solvent.

[5] The lithium ion secondary battery according to [4], wherein the linear carbonate solvent comprises at least one solvent selected from the group consisting of dimethyl carbonate, ethyl methyl carbonate, and diethyl carbonate, and the cyclic carbonate solvent comprises at least one solvent selected from the group consisting of ethylene carbonate, propylene carbonate, and fluoroethylene carbonate.

[6] The lithium ion secondary battery according to any one of [1] to [5], wherein the amount of the fluorine-containing ether compound is 1% by volume to 90% by volume, based on the total volume of the electrolytic liquid.

Effect of the Invention

According to the present invention, it becomes possible to suppress the capacity decrease of a lithium ion secondary battery occurring through the repetition of charge/discharge cycle as compared to the conventional batteries even when the working voltage is set at 4.5 V or higher, which is higher than the conventional working voltage, i.e., 3.5 to 4.2 V. Therefore, the battery of the present invention can be used repeatedly as a high energy density secondary battery over a longer period of time as compared to the conventional batteries.

BRIEF DESCRIPTION OF THE DRAWINGS

FIG. 1 is a schematic cross-sectional view showing the construction of an electrode element of a lithium ion secondary battery of a stacked laminate type.

BEST MODE FOR CARRYING OUT THE INVENTION

《Lithium Ion Secondary Battery》

The lithium ion secondary battery of the first embodiment of the present invention includes: a positive electrode including a positive electrode active material; a negative electrode including, as a main component, a material capable of storing and releasing lithium ions; and an electrolytic liquid.

<Positive Electrode Active Material>

The positive electrode active material is a lithium-iron-manganese complex oxide having a layered rock salt structure and represented by a chemical formula:

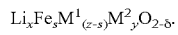
$Li_xFe_sM^1_{(z-s)}M^2_yO_{2-\delta}$.

Here, the "layered rock salt structure" possessed by the lithium-iron-manganese complex oxide means a layered structure capable of diffracting or scattering X-ray. That is, at least a part of the oxide has a crystallinity. As an example of such a layered rock salt structure, there can be mentioned an α-NaFeO₂ type structure. This type of structure is conventionally known as a structure where a transition metal and lithium are arrayed orderly in the direction of the [111] axis of cubic rock salt type structure to form two-dimensional planes, and a battery reaction can proceed due to the two-dimensional diffusion of the lithium. The type of the aforementioned lithium-iron-manganese complex oxide having a layered rock salt structure is not particularly limited, and may be α-NaFeO₂ type or any of other types. The layered rock salt structure of the oxide may contain a structure where a transition metal is irregularly arranged in a lithium layer, or a structure where lithium is irregularly arranged in a transition metal layer. However, such irregular structures may deteriorate the charge/discharge characteristics of a battery; hence, it is preferred that such irregular structures are not contained in the layered rock salt structure.

The "layered rock salt structure" possessed by the lithium-iron-manganese complex oxide can be analyzed by conventional means such as powder X-ray diffractometry, powder neutron diffractometry, X-ray or neutron small angle scattering or total scattering method, or magnetic measurement method.

In the chemical formula $Li_xFe_sM^1_{(z-s)}M^2_yO_{2-\delta}$ representing the lithium-iron-manganese complex oxide having a layered rock salt structure, the respective parameters are as follows.

$1.05 \leq x \leq 1.32$, $0.06 \leq s \leq 0.50$, $0.06 \leq z \leq 0.50$, $0.33 \leq y \leq 0.63$, $0 \leq \delta \leq 0.80$, $M^1$ represents at least one metal selected from the group consisting of Co, Ni and Mn, or a mixture of these metals, $M^2$ represent at least one metal selected from the group consisting of Mn, Ti and Zr, or a mixture of these metals.

In the aforementioned chemical formula, $M^1$ is preferably Co or Ni, and more preferably Ni. $M^2$ is preferably Mn or Ti, and more preferably Mn.

The method for synthesizing the lithium-iron-manganese complex oxide is not particularly limited, any known method for synthesizing an oxide having a layered rock salt structure can be employed. Specifically, for example, any known method for synthesizing the aforementioned sodium-iron complex oxide (α-NaFeO₂ type) can be employed. As a known method that can be employed for synthesizing the lithium-iron-manganese complex oxide represented by the aforementioned chemical formula, for example, reference can be made to Japanese Patent Application Unexamined Publication No. 2013-100197.

The weight of the lithium-iron-manganese complex oxide, based on the total weight of the positive electrode, is not particularly limited, but is preferably 50 to 99% by weight, more preferably 70 to 99% by weight, and still more preferably 85 to 95% by weight.

The lithium-iron-manganese complex oxide constituting the positive electrode may be either of one type or two or more types.

The positive electrode may contain a further positive electrode active material other than the lithium-iron-manganese complex oxide, or an electroconductive auxiliary material. As such materials, any positive electrode materials and auxiliary conducting agents used in conventional lithium ion secondary batteries can be employed, and specific examples thereof include carbonaceous materials such as Ketjenblack.

The components of the positive electrode other than the aforementioned positive electrode active material are not particularly limited, and any known electroconductive auxiliary materials, binders, resins and the like can be used. For example, polyvinylidene difluoride can be used.

<Fluorinated Ether>

The aforementioned fluorinated ether (hereinafter, also referred to as "fluorine-containing ether compound") is preferably a fluorine-containing ether compound represented by the following formula (I):

$R^1-O-R^2$     (I)

wherein $R^1$ represents an alkyl group having 3 to 8 carbon atoms, and $R^2$ represents an alkyl group having one carbon atom, with the proviso that at least six of hydrogen atoms bonded to the carbon atoms of the alkyl group as $R^1$ are substituted with fluorine atoms, and that at least one of hydrogen atoms bonded to the carbon atoms of the alkyl group as $R^2$ is substituted with a fluorine atom.

In the general formula (I), $R^1$ is a linear, branched or cyclic alkyl group. For improving the solubility of the fluorine-containing ether compound in the non-aqueous solvent, $R^1$ is preferably a linear or branched alkyl group and is more preferably a linear alkyl group.

For improving the solubility of the fluorine-containing ether compound in the non-aqueous solvent, the number of carbon atoms constituting the alkyl group represented by $R^1$ is preferably 3 to 6, more preferably 3 to 5, and still more preferably 3 or 4.

In the alkyl group represented by $R^1$, at least 6 of the hydrogen atoms of the alkyl group are substituted with fluorine atoms. All of the hydrogen atoms of the alkyl group represented by $R^1$ may be substituted with fluorine atoms, but $R^1$ preferably has at least one hydrogen atom.

In the alkyl group represented by $R^2$, which is a methyl group, at least one of the hydrogen atoms of the alkyl group is substituted with a fluorine atom. All of the hydrogen atoms of the methyl group represented by $R^2$ may be substituted with fluorine atoms, but $R^2$ preferably has at least one hydrogen atom.

As a preferred example of the fluorine-containing ether compounds represented by the formula (I), there can be mentioned a compound represented by the following formula (I-a):

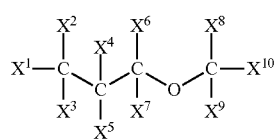

(I-a)

wherein each of $X^1$ to $X^{10}$ represents a hydrogen atom or a fluorine atom, with the proviso that at least 6 of $X^1$ to $X^7$ are fluorine atoms, and at least one of $X^8$ to $X^{10}$ is a fluorine atom.

In the formula (I-a), it is preferred that any one of $X^4$ to $X^7$ is a hydrogen atom, and it is more preferred that $X^4$ or $X^5$ is a hydrogen atom.

In the formula (I-a), it is preferred that any one or two of $X^8$ to $X^{10}$ are hydrogen atoms, and it is more preferred that any one of $X^8$ to $X^{10}$ is a hydrogen atom.

The more preferred examples of the fluorine-containing ether compound used in the electrolytic liquid of this embodiment include those represented by the following formulae (I-a-1) to (I-a-6), among which 1,1,2,3,3,3-hexafluoropropyl difluoromethyl ether represented by the following formula (I-a-1) is especially preferred.

 $CF_3$—$CHF$—$CF_2$—$O$—$CHF_2$ (I-a-1)

 $CF_3$—$CF_2$—$CHF$—$O$—$CHF_2$ (I-a-2)

 $CF_3$—$CHF$—$CF_2$—$O$—$CH_2F$ (I-a-3)

 $CF_3$—$CF_2$—$CHF$—$O$—$CH_2F$ (I-a-4)

 $CF_3$—$CHF$—$CF_2$—$O$—$CF_3$ (I-a-5)

 $CF_3$—$CF_2$—$CHF$—$O$—$CF_3$ (I-a-6)

The fluorine-containing ether compound contained in the electrolytic liquid of this embodiment may be either of one type or two or more types.

With respect to the ratio of the aforementioned fluorine-containing ether compound (fluorinated ether) in the electrolytic liquid as a whole, the amount of the fluorine-containing ether compound is preferably 1% by volume to 90% by volume, more preferably 1% by volume to 60% by volume, still more preferably 3% by volume to 30% by volume, and especially preferably 5% by volume to 20% by volume, based on the total volume of the electrolytic liquid.

<Electrolytic Liquid>

The electrolytic liquid preferably includes a non-aqueous solvent as well as the aforementioned fluorine-containing ether compound. With respect to the non-aqueous solvent used in the electrolytic liquid, the solvent is preferably an organic solvent that can stably dissolve the fluorine-containing ether compound and can dissolve a lithium salt used as a supporting salt. Examples of the organic solvent include a linear carbonate solvent and a cyclic carbonate solvent.

Specific examples of such organic solvents include carbonic ester compounds such as ethylene carbonate (EC), propylene carbonate, butylene carbonate, dimethyl carbonate, methyl ethyl carbonate, diethyl carbonate (DEC), and vinylene carbonate; fluorine-containing carbonic ester compounds in each of which at least any one of the hydrogen atoms of the aforementioned carbonic ester compound is substituted with a fluorine atom; lactone compounds such as γ-butyrolactone; carboxylic ester compounds such as methyl formate, methyl acetate, and methyl propionate; ether compounds such as tetrahydrofuran, and dimethoxyethane; nitrile compounds such as acetonitrile; and sulfone compounds such as sulfolane.

Regarding the organic solvent as exemplified above, the organic solvent preferably contains at least one linear carbonate solvent selected from the group consisting of dimethyl carbonate, ethyl methyl carbonate, and diethyl carbonate, and at least one cyclic carbonate solvent selected from the group consisting of ethylene carbonate, propylene carbonate, and fluoroethylene carbonate.

With respect to the aforementioned organic solvent, a single type thereof may be used individually or two or more types thereof may be used in combination.

The aforementioned organic solvent is preferably a mixed solvent comprising two or more types of the compounds selected from the group consisting of the aforementioned carbonic ester compounds and fluorine-containing carbonic ester compounds. The mixing ratio of the solvents contained in the mixed solvent can be determined in view of the solubilities of the aforementioned fluorine-containing ether compound and lithium salt, and the stability of the mixed solvents.

As a preferred example of the mixed solvent, there can be mentioned a mixed solvent comprising ethylene carbonate (EC) and diethylene carbonate (DEC). The volume ratio of EC:DEC is preferably 10:90 to 90:10, more preferably 20:80 to 50:50, and still more preferably 30:70 to 40:60.

As a preferred example of the mixed solvent, there can be mentioned a mixed solvent comprising monofluoroethylene carbonate (FEC) and diethylene carbonate (DEC). The volume ratio of FEC:DEC is preferably 35:65 to 65:35, more preferably 40:60 to 60:40, still more preferably 45:55 to 55:45.

For suppressing the capacity decrease of the lithium ion secondary battery occurring through the repetition of charge/discharge cycle, the amount of FEC is preferably 30 to 70% by volume, based on the total volume of the non-aqueous solvent.

<Material Capable of Storing and Releasing Lithium Ions>

The material capable of storing and releasing lithium ions is not particularly limited, and any of those which are used in conventional lithium ion secondary batteries can be used. Specific examples of such a material include elemental silicon, silicon oxide and carbon. As examples of the silicon oxide, there can be mentioned silicon monoxide (SiO) and silicon dioxide ($SiO_2$).

As examples of the aforementioned carbon, there can be mentioned amorphous carbon, diamond-like carbon, carbon nanotubes, or a composite thereof. Here, graphite having a high crystallinity has an advantage in that such graphite has a high electroconductivity, and has excellent adhesiveness with a negative electrode current collector formed of a metal such as copper, and excellent voltage flatness. By contrast, amorphous carbon having a low crystallinity has an advantage in that such amorphous carbon exhibits relatively small volume expansion and, hence, has high effect of alleviating the volume expansion of the negative electrode as a whole, and is unlikely to cause deterioration attributable to nonuniformity such as crystal grain boundaries and defects.

The amount of the aforementioned material capable of storing and releasing lithium ions is not particularly limited, but is preferably 50 to 99% by weight, more preferably 65 to 95% by mass, and still more preferably 80 to 95% by mass, based on the total mass of the negative electrode.

The components of the negative electrode other than the aforementioned material capable of storing and releasing lithium ions are not particularly limited, and any known binders, resins and the like can be used. For example, it is appropriate to use a polyamic acid capable of forming a polyimide resin by heating.

<Lithium Salt>

As the lithium salt to be contained in the electrolytic liquid of this embodiment, for example, any of those generally used in known lithium ion secondary batteries can be used. Specific examples of the lithium salt include lithium hexafluorophosphate ($LiPF_6$), lithium tetrafluoroborate ($LiBF_4$), lithium bis(fluorosulfonyl)imide (LiFSI), and lithium bis(trifluoromethanesulfonyl)imide ($LiN(SO_2CF_3)_2$, LiTFSI). With respect to the lithium salt, a single type thereof may be used individually or two or more types thereof may be used in combination.

The amount of the lithium salt (based on the total amount of the electrolytic liquid of the present embodiment) is not particularly limited, and may be appropriately adjusted so as to give the lithium atom (Li) concentration of preferably 0.2 to 3.0 mol/L and more preferably 0.4 to 2.0 mol/L.

<Optional Component>

The electrolytic liquid of the present embodiment may contain optional component other than the aforementioned non-aqueous solvent, lithium salt and fluorine-containing ether compound, as long as the effects of the present invention would not be unfavorably affected. The optional component can be appropriately selected depending on the purpose and is not particularly limited.

<Boron-Containing Compound>

The electrolytic liquid of the present embodiment may contain, as an optional component, a boron-containing compound represented by the following formula (B-1):

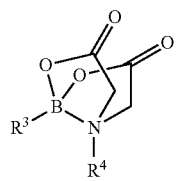

(B-1)

wherein $R^3$ represents an alkyl group having 1 to 4 carbon atoms or an alkenyl group having 2 to 4 carbon atoms, and $R^4$ represents an alkyl group having 1 to 4 carbon atoms.

When $R^3$ in the formula (B-1) is an alkyl group, this alkyl group is preferably a linear or branched alkyl group and is more preferably a linear alkyl group for suppressing the capacity decrease of the lithium ion secondary battery occurring through the charge and discharge. The number of carbon atoms of the alkyl group is preferably 1 to 3, and more preferably 1 or 2.

When $R^3$ in the formula (B-1) is an alkenyl group, the alkenyl group is preferably a vinyl group, a 1-propenyl group or a 2-propenyl group (allyl group), more preferably a vinyl group or an allyl group and still more preferably a vinyl group, for suppressing the capacity decrease of the lithium ion secondary battery occurring through the charge and discharge.

In the general formula (B-1), $R^4$ is a linear, branched or cyclic alkyl group. For improving the solubility of the boron-containing compound in the non-aqueous solvent, $R^4$ is preferably a linear or branched alkyl group and is more preferably a linear alkyl group.

For improving the solubility of the boron-containing compound in the non-aqueous solvent, the number of carbon atoms constituting the alkyl group represented by $R^4$ is preferably 1 to 3, is more preferably 1 or 2, and still more preferably 1.

Preferred examples of the compound represented by the formula (B-1) include vinylboronic acid (N-methyliminodiacetic acid) methyl ester, vinyl boronic acid (N-methyliminodiacetic acid) ethyl ester, and allylboric acid (N-methyliminodiacetic acid) ethyl ester. Among these, it is especially preferred to use vinylboronic acid (N-methyliminodiacetic acid) methyl ester represented by the following formula (B-1-s) since the capacity decrease of the lithium ion secondary battery can be further suppressed.

The boron-containing compound of the general formula (B-1) contained in the electrolytic liquid of this embodiment may be either of one type or two or more types.

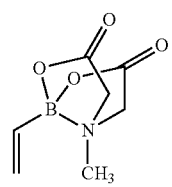

(B-1-s)

In the electrolytic liquid according to this embodiment, the amount of the boron-containing compound is preferably 0.01 to 5% by mass, more preferably 0.03 to 1% by mass, still more preferably 0.06 to 0.5% by mass.

In the electrolytic liquid of this embodiment, the amount of the boron-containing compound is 5 parts by mass or less, more preferably 1 part by mass or less, relative to 100 parts by mass of the fluorine-containing ether compound.

<Preparation of Electrolytic Liquid>

The method for preparing the electrolytic liquid of this embodiment is not particularly limited as long as the aforementioned non-aqueous solvent, lithium salt, fluorine-containing ether compound and, if necessary, optional components can be uniformly dissolved or dispersed in a mixture thereof, and any conventional methods for preparing an electrolytic liquid can be employed.

《Lithium Ion Secondary Battery》

The lithium ion secondary battery of the present invention includes the aforementioned positive electrode, negative electrode and electrolytic liquid.

With respect to the other components than mentioned above, those used in conventional lithium ion secondary batteries can be used.

Hereinbelow, explanations are made on an example of embodiment applicable to the lithium ion secondary battery of the present invention; however, the present invention is not limited to this embodiment.

As an example of construction of the lithium ion secondary battery of the present embodiment, there can be mentioned a construction in which a battery element with positive and negative electrodes provided oppositely to each other, and an electrolytic liquid are accommodated within an outer casing. The shape of the lithium ion secondary battery is not particularly limited, and may be any of cylindrical type, flattened spiral square type, stacked square type, coin type, flattened spiral laminate type, and stacked laminate type. Among these, stacked laminate type is preferable. A stacked laminate type secondary battery is explained below as one example of the present embodiment.

FIG. 1 is a schematic cross-sectional view showing the construction of a battery element (electrode element) of a secondary battery of a stacked laminate type. This electrode element is formed by laminating a plurality of positive electrodes 1 and a plurality of negative electrodes 2 through separators 3. The positive electrode current collectors 1A of the respective positive electrodes 1 are electrically connected together by welding the end portions thereof which are not coated with the positive electrode active material. To the welded portions are further welded positive electrode lead tabs 1B. The negative electrode current collectors 2A of the respective negative electrodes 2 are electrically connected together by welding the end portions thereof which are not coated with the negative electrode active material. To the welded portions are further welded negative electrode lead tabs 2B.

<Negative Electrode>

The negative electrode is formed, for example, by binding a negative electrode active material on a negative electrode current collector with a negative electrode binder so as to cover the negative electrode current collector. The negative electrode active material contains, for example, a carbonaceous material (a) capable of storing and releasing lithium ions, a metal (b) capable of being alloyed with lithium, and a metal oxide (c) capable of storing and releasing lithium ions.

As the carbonaceous material (a), graphite, amorphous carbon, diamond-like carbon, carbon nanotubes, or a composite thereof can be used. Here, graphite having a high crystallinity has an advantage in that such graphite has a high electroconductivity, and has excellent adhesiveness with a positive electrode current collector formed of a metal such as copper, and excellent voltage flatness. By contrast, amorphous carbon having a low crystallinity has an advantage in that such amorphous carbon exhibits relatively small volume expansion and, hence, has high effect of alleviating the volume expansion of the negative electrode as a whole, and is unlikely to cause deterioration attributable to nonuniformity such as crystal grain boundaries and defects.

As the metal (b), Al, Si, Pb, Sn, In, Bi, Ag, Ba, Ca, Hg, Pd, Pt, Te, Zn, La or an alloy of two or more thereof can be used.

It is particularly preferred that silicon (Si) is contained as the metal (b).

As the metal oxide (c), silicon oxide, aluminum oxide, tin oxide, indium oxide, zinc oxide, lithium oxide, or a composite thereof can be used. In particular, it is preferred that silicon oxide is contained as the metal oxide (c) because the silicon oxide is relatively stable and is unlikely to cause reactions with other compounds.

Further, it is preferred that the metal oxide (c) is an oxide of the metal used as the metal (b). For improving the electroconductivity of the metal oxide (c), other element may be added to the metal oxide (c) in an amount of, for example, from 0.1 to 5% by mass. The other element is at least one element selected from the group consisting of nitrogen, boron and sulfur.

The whole or a part of the metal oxide (c) preferably has an amorphous structure. The metal oxide (c) of an amorphous structure can suppress the volume expansion of the carbonaceous material (a) and the metal (b), and can also suppress decomposition of the electrolytic liquid containing the fluorine-containing ether compound. This mechanism is not clear, but it is presumed that the metal oxide (c) having an amorphous structure has some influence on the film formation at the interface between the carbonaceous material (a) and the electrolytic liquid. The amorphous structure is believed to have a relatively low level of factors attributable to nonuniformity such as crystal grain boundary or a defect. The presence of amorphous structure forming the whole or a part of the metal oxide (c) can be confirmed by X-ray diffractometry (general XRD measurement). Specifically, in the case where the metal oxide (c) has no amorphous structure, a distinct peak unique to the metal oxide (c) is observed, whereas in the case where the whole or a part of the metal oxide (b) has an amorphous structure, the peak unique to the metal oxide (c) is observed to have a widened broad shape.

The whole or a part of the metal (b) is preferably dispersed in the metal oxide (c). Dispersing at least a part of the metal (b) in the metal oxide (c) can further suppress the volume expansion of a negative electrode as a whole, and can also suppress the decomposition of an electrolytic liquid. The whole or a part of metal (b) being dispersed in the metal oxide (c) can be confirmed by the combined use of the transmission electron microscopic observation (general TEM observation) and the energy dispersive X-ray spectroscopy (general EDX measurement). Specifically, by observing the cross-section of a sample containing the metal particle (b) and measuring the oxygen concentration of the metal particle (b) dispersed in the metal oxide (c), it can be confirmed that the metal constituting the metal particle (b) has not turned into an oxide.

A negative electrode active material containing a carbonaceous material (a), a metal (b), and a metal oxide (c) with the whole or a part of the metal oxide (c) having an amorphous structure and the whole or a part of the metal (b) being dispersed in the metal oxide (c) can be produced by a conventional method. That is, subjecting the metal oxide (c) to a CVD process in an atmosphere containing an organic gas such as a methane gas can give a composite in which the metal (b) in the metal oxide (c) is made into nanoclusters and is covered on its surface with the carbonaceous material (a). Alternatively, the negative electrode active material can be produced by mixing the carbonaceous material (a), the metal (b) and the metal oxide (c) by mechanical milling.

The respective amounts of the carbonaceous material (a), the metal (b) and the metal oxide (c), based on the total amount of the negative electrode, are not particularly limited. The amount of the carbonaceous material (a) is preferably 2 to 50% by mass, and more preferably 2 to 30% by mass, based on the total mass of the carbonaceous material (a), the metal (b) and the metal oxide (c). The amount of the metal (b) is preferably 5 to 90% by mass, and more preferably 20 to 50% by mass, based on the total mass of the carbonaceous material (a), the metal (b) and the metal oxide (c). The amount of the metal oxide (c) is preferably 5 to 90% by mass, and more preferably 40 to 70% by mass, based on the total mass of the carbonaceous material (a), the metal (b) and the metal oxide (c).

Further, the amount of the carbonaceous material (a), based on the total amount of the negative electrode, may be 0%. In such a case, the total amount of the metal (b) and the metal oxide (c) may be 100% by mass of the negative electrode active material. Further, a negative electrode material consisting only of the metal (b) and the metal oxide (c) may be used instead of the aforementioned negative electrode active material.

The shapes of the carbonaceous material (a), the metal (b) and the metal oxide (c) are not particularly limited, and each of these may be, for example, in the form of particles. In this case, for example, the average particle diameter of the metal (b) may be smaller than the average particle diameters of the carbonaceous material (a) and the metal oxide (c). With such a relationship of average particle diameters, the particle diameter of metal (b) which undergoes small volume change during the charge/discharge cycle is relatively small while the particle diameters of carbonaceous material (a) and metal oxide (c) which undergo large volume change are relatively large; therefore, the formation of dendrite and minute alloy powder can be more effectively suppressed. Further, lithium is consequently stored in and released from the large-sized particle, the small-sized particle and the large-sized particle in this order in the charge/discharge process, and also from this point, the generation of the residual stress and the residual strain is suppressed. The average particle diameter of metal (b) may be, for example, 20 μm or less, and is preferably 15 μm or less.

The average particle diameter of metal oxide (c) is preferably ½ or less of that of carbonaceous material (a), and the average particle diameter of metal (b) is preferably ½ or less of that of metal oxide (c). It is more preferable that the average particle diameter of metal oxide (c) is ½ or less of that of carbonaceous material (a), and that, simultaneously, the average particle diameter of metal (b) is ½ or less of that of metal oxide (c). Controlling the average particle diameters within such ranges enables to achieve more efficiently the effect of alleviating the volume expansion of the metal and the alloy phase, and to obtain a secondary battery that has excellent balance of energy density, cycle life and efficiency. As a specific example, it is preferable that the average particle diameter of silicon oxide (c) is ½ or less of that of graphite (a), and the average particle diameter of silicon (b) is ½ or less of that of silicon oxide (c). More specifically, the average particle diameter of silicon (b) may be, for example, 20 μm or less, and preferably 15 μm or less.

Examples of the negative electrode binder include polyvinylidene fluoride, vinylidene fluoride-hexafluoropropylene copolymer, vinylidene fluoride-tetrafluoroethylene copolymer, a styrene-butadiene copolymer rubber, polytetrafluoroethylene, polypropylene, polyethylene, polyimide, and polyamide-imide. Of these, polyimide and polyamide-imide are preferred from the viewpoint of strong adhesiveness. The amount of the negative electrode binder is preferably 5 to 25 parts by mass, relative to 100 parts by mass of a negative electrode active material, from the viewpoint of balancing the requirements for "sufficient binding force" and "higher energy", which are in a tradeoff relationship.

As the negative electrode current collector, for example, aluminum, nickel, copper, silver and an alloy thereof are preferred from the viewpoint of the electrochemical stability. The shape thereof is not particularly limited, and examples thereof include a foil, a plate-shape and a mesh-shape.

As a method for producing the negative electrode, there can be a method in which a negative electrode active material layer containing the negative electrode active material and the negative electrode binder is formed on the negative electrode current collector. The negative electrode active material layer can be formed, for example, by a doctor blade method, a die coater method, or the like. The negative electrode current collector may be a thin film of aluminum, nickel or an alloy thereof, which is formed on the negative electrode active material layer formed on an appropriate supporting body, wherein the thin film is formed by a method such as vapor deposition or sputtering. The thin film can be formed, for example, by CVD method, sputtering, or the like.

<Positive Electrode>

The positive electrode is formed, for example, by binding a positive electrode active material on a positive electrode current collector with a positive electrode binder so as to cover the positive electrode current collector. The positive electrode active substance includes the lithium-iron-manganese complex oxide having a layered rock salt structure, which is represented by the aforementioned chemical formula: $Li_xFe_sM^1_{(z-s)}M^2_yO_{2-\delta}$.

As examples of positive electrode active material other than mentioned above, there can be mentioned a lithium manganate having a layered structure or a lithium manganate having a spinel structure, such as $LiMnO_2$ and $Li_xMn_2O_4$ (0<x<2); $LiCoO_2$, $LiNiO_2$ and materials in which a part of the transition metal thereof is substituted with another metal; lithium transition metal oxides such as $LiNi_{1/3}Co_{1/3}Mn_{1/3}O_2$, in which the molar amount of a specific transition metal does not exceed a half of the total molar amount of the transition metals; and materials which contain lithium in an excess amount relative to the stoichiometric amount in these lithium transition metal oxides. Of these, particularly preferred are $Li_\alpha Ni_\beta Co_\gamma Al_\delta O_2$ (1≤α≤1.2, β+γ+δ=1, β≥0.7, γ≤0.2) and $Li_\alpha Ni_\beta Co_\gamma Mn_\delta O_2$ (1≤α≤1.2, β+γ+δ=1, β≥0.6, γ≤0.2). With respect to the aforementioned positive electrode active materials, a single type thereof may be used individually or two or more types thereof may be used in combination.

As the positive electrode binder, the same as mentioned above for the negative electrode can be used. Polyvinylidene fluoride is preferable from the viewpoint of versatility and low cost. The amount of the positive electrode binder is preferably 2 to 10 parts by mass, relative to 100 parts by mass of the positive electrode active material, from the viewpoint of balancing the requirements for "sufficient binding force" and "higher energy", which are in a tradeoff relationship.

As the current collector for positive electrode, the same as mentioned above for the negative electrode can be used.

An electroconductive auxiliary material may be added to the positive electrode active material layer containing a positive electrode active material in order to reduce impedance. Examples of the electroconductive auxiliary material include carbonaceous microparticles of graphite, carbon black, acetylene black and the like.

<Separator>

As the aforementioned separator, porous films or non-woven fabrics of polypropylene, polyethylene or the like can be used. A laminate of any of such porous films or non-woven fabrics can also be used as the separator.

<Outer Casing>

The outer casing can be appropriately selected as long as it is stable against an electrolytic liquid and it has a water vapor barrier property.

For example, in the case of a stacked laminate type secondary battery, a lamination film of polypropylene, polyethylene or the like which is coated with aluminum or silica is preferably used as an outer casing. Particularly, it is preferable to use an aluminum lamination film from the viewpoint of suppression of volume expansion.

EXAMPLES

Hereinbelow, the present invention will be described with reference to the examples which, however, should not be construed as limiting the present invention.

Example 1

<Positive Electrode>

A slurry containing 92% by weight of a lithium oxide $Li_{1.136}Fe_{0.16}Ni_{0.151}Mn_{0.475}O_2$ having a layered rock salt structure, 4% by weight of Ketjenblack and 4% by weight of polyvinylidene fluoride was coated on a positive electrode current collector 1A formed of an aluminum foil having a thickness of 20 μm, followed by drying, to produce a positive electrode 1 having a thickness of 175 μm. Similarly, a double-sided electrode was produced, which includes a positive electrode current collector 1A having positive electrodes 1 formed on both sides thereof by the application and drying of the slurry.

<Negative Electrode>

A slurry containing 85% by mass of SiO having an average particle size of 15 μm and 15% by mass of polyamic acid was coated on a negative electrode current collector 2A formed of a copper foil having a thickness of 10 μm, followed by drying, to produce a negative electrode 2 having a thickness of 46 μm. The produced negative electrode was annealed in nitrogen atmosphere at 350° C. for 3 hours, to thereby cure the binder.

<Electrolytic Liquid>

1,1,2,3,3,3-hexafluoropropyldifluoromethyl ether (HFPDFME), fluoroethylene carbonate (FEC) and diethyl carbonate (DEC) were mixed at a volume ratio of 10/45/45, into which was dissolved 1.0M of lithium hexafluorophosphate ($LiPF_6$), thereby obtaining an electrolytic liquid.

<Manufacture of Lithium Ion Secondary Battery>

The produced positive and negative electrodes were formed into predetermined shapes, and laminated through a porous film separator. Then, a positive electrode lead tab 1B formed of an Al plate and a negative electrode lead tab 2B formed of a Ni plate were respectively welded to the laminate, thereby producing a battery element (see FIG. 1). The battery element was covered with an outer casing 4 formed of an aluminum laminate film, and the resulting was heat sealed at three sides. Then, the battery element was impregnated with the aforementioned electrolytic liquid at an appropriate degree of vacuum. Thereafter, the remaining side of the outer casing 4 was heat sealed to obtain a lithium ion secondary battery prior to activation treatment.

<Activation Treatment Step>

The manufactured lithium ion secondary battery prior to activation treatment was charged with a current of 20 mA per 1 g of the positive electrode active material to 4.5V and discharged with the same current of 20 mA per 1 g of the positive electrode active material to 1.5V. This cycle of charge and discharge was repeated twice. Then, the seal of the outer casing was broken at one side thereof and the inside of the battery was degassed under reduced pressure. The outer casing was sealed again to produce a lithium ion secondary battery of Example 1 according to the present invention.

Example 2

A lithium ion secondary battery was produced in the same manner as in Example 1 except that the lithium oxide $Li_{1.136}Fe_{0.16}Ni_{0.151}Mn_{0.475}O_2$ having a layered rock salt structure was replaced with $Li_{1.21}Fe_{0.15}Ni_{0.15}Mn_{0.46}O_{1.99}$.

Example 3

A lithium ion secondary batter was produced in the same manner as in Example 1 except that a mixed solvent of HFPDFME/EC/DEC=10/27/63 (volume ratio) was used instead of a mixed solvent of HFPDFME/FEC/DEC=10/45/45 (volume ratio).

Comparative Example 1

A lithium ion secondary batter was produced in the same manner as in Example 1 except that a mixed solvent of FEC/DEC=50/50 (volume ratio) was used instead of a mixed solvent of HFPDFME/FEC/DEC=10/45/45 (volume ratio).

Comparative Example 2

A lithium ion secondary battery was produced in the same manner as in Example 1 except that a mixed solvent of EC/DEC=30/70 (volume ratio) was used instead of a mixed solvent of HFPDFME/FEC/DEC=10/45/45 (volume ratio).

Comparative Example 3

A lithium ion secondary battery was produced in the same manner as in Example 1 except that a mixed solvent of FEC/EC/DEC=10/27/63 (volume ratio) was used instead of a mixed solvent of HFPDFME/FEC/DEC=10/45/45 (volume ratio).

Comparative Example 4

A lithium ion secondary battery was produced in the same manner as in Example 1 except that a mixed solvent of tris(2,2,2-trifluoroethyl)phosphate (TTFEP)/EC/DEC=10/27/63 (volume ratio) was used instead of a mixed solvent of HFPDFME/FEC/DEC=10/45/45 (volume ratio).

Comparative Example 5

A lithium ion secondary battery was produced in the same manner as in Example 1 except that a mixed solvent of heptafluoropropyl-1,2,2,2-tetrafluoroethyl ether (HFPTFEE)(HFPTFEE)/EC/DEC=10/27/63 (volume ratio) was used instead of a mixed solvent of HFPDFME/FEC/DEC=10/45/45 (volume ratio).

<Evaluation of Lithium Ion Secondary Battery>

The manufactured lithium ion secondary battery was charged with a constant current of 40 mA per 1 g of the positive electrode active material in a thermostatic chamber having a temperature of 45° C. to 4.5V and continued to be charged at a constant voltage of 4.5 V until the current became 5 mA per 1 g of the positive electrode active material. Then, the battery was discharged with a current of 5 mA per 1 g of the positive electrode active material to 1.5 V and the initial capacity was determined. After the determination of the initial capacity, the lithium ion secondary battery was charged with a constant current of 40 mA per 1 g of the positive electrode active material in a thermostatic chamber having a temperature of 45° C. to 4.5V and continued to be charged at a constant voltage of 4.5 V until the current became 5 mA per 1 g of the positive electrode active material. Then, the battery was discharged with a current of 40 mA per 1 g of the positive electrode active material to 1.5 V. This cycle of charge and discharge was repeated 30 times. Then, the capacity maintenance ratio (unit: %) after 30 cycles was determined from the ratio of the initial capacity determined at the 1st cycle (unit: mAh/g) and the discharge capacity determined at the 30th cycle. The results are shown in Table 1.

TABLE 1

| | Solvent composition of electrolytic solution (volume ratio) | Positive electrode active material | Initial capacity mAh/g | Capacity maintenance ratio |
|---|---|---|---|---|
| Example 1 | HFPDFME/FEC/DEC = 10/45/45 | $Li_{1.136}Fe_{0.16}Ni_{0.151}Mn_{0.475}O_2$ | 252 | 73% |
| Example 2 | HFPDFME/FEC/DEC = 10/45/45 | $Li_{1.21}Fe_{0.15}Ni_{0.15}Mn_{0.46}O_{1.99}$ | 249 | 72% |
| Example 3 | HFPDFME/EC/DEC = 10/27/63 | $Li_{1.136}Fe_{0.16}Ni_{0.151}Mn_{0.475}O_2$ | 240 | 70% |
| Comparative Example 1 | FEC/DEC = 50/50 | $Li_{1.136}Fe_{0.16}Ni_{0.151}Mn_{0.475}O_2$ | 230 | 62% |
| Comparative Example 2 | EC/DEC = 30/70 | $Li_{1.136}Fe_{0.16}Ni_{0.151}Mn_{0.475}O_2$ | 219 | 36% |
| Comparative Example 3 | FEC/EC/DEC = 10/27/63 | $Li_{1.136}Fe_{0.16}Ni_{0.151}Mn_{0.475}O_2$ | 228 | 60% |
| Comparative Example 4 | TTFEP/EC/DEC = 10/27/63 | $Li_{1.136}Fe_{0.16}Ni_{0.151}Mn_{0.475}O_2$ | 225 | 58% |
| Comparative Example 5 | HFPTFEE/EC/DEC == 10/27/63 | $Li_{1.136}Fe_{0.16}Ni_{0.151}Mn_{0.475}O_2$ | 235 | 35% |

From the comparison between Examples 1, 2 and Comparative Example 1, and the comparison between Example 3 and Comparative Example 2, it has been found that the mixing of 1,1,2,3,3,3-hexafluoropropyldifluoromethyl ether (HFPDFME) into an electrolytic liquid enables to stably obtain a high capacity even in a case where the voltage at the discharge is set at 4.5 V which is higher than the voltage of conventional use.

Further, from the comparison between Example 3 and Comparative Examples 3 and 4, it has been found that, when a fluorine-containing compound is added to an electrolytic liquid, especially the mixing of 1,1,2,3,3,3-hexafluoropropyldifluoromethyl ether (HFPDFME) into an electrolytic liquid enables to stably obtain a high capacity even in a case where the voltage at the discharge is set at 4.5 V which is higher than the voltage of conventional use.

From the comparison between Example 1 and Comparative Example 5, it has been found that, among the linear fluorine-containing ether compounds, especially the use of 1,1,2,3,3,3-hexafluoropropyldifluoromethyl ether (HFPDFME) enables to stably obtain a high capacity even in a case where the voltage at the discharge is set at 4.5 V which is higher than the voltage of conventional use.

INDUSTRIAL APPLICABILITY

The present invention is applicable in the field of a lithium ion secondary battery.

DESCRIPTION OF THE REFERENCE SIGNS

1 Positive Electrode
1A Current collector for positive electrode
1B Lead tab for positive electrode
2 Negative electrode
2A Current collector for negative electrode
2B Lead tab for negative electrode
3 Porous separator
4 Outer casing

The invention claimed is:
1. A lithium ion secondary battery comprising: a positive electrode comprising a positive electrode active material; a negative electrode comprised mainly of a material capable of storing and releasing lithium ions; and an electrolytic liquid, the positive electrode active material being a lithium-iron-manganese complex oxide having a layered rock salt structure and represented by a chemical formula:

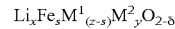

wherein 1.05≤x≤1.32, 0.06≤s≤0.50, 0.06≤z≤0.50, 0.33≤y≤0.63, and 0≤δ≤0.80; $M^1$ represents a metal selected from the group consisting of Co, Ni, Mn and a mixture thereof; and $M^2$ represents a metal selected from the group consisting of Mn, Ti, Zr and a mixture thereof,
the electrolytic liquid comprising 1,1,2,3,3,3-hexafluoropropyl difluoromethyl ether represented by the following formula (1):

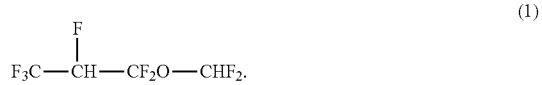

2. The lithium ion secondary battery according to claim 1, wherein the main component of $M^1$ is Ni, and the main component of $M^2$ is Mn.

3. The lithium ion secondary battery according to claim 1, wherein the material capable of storing and releasing lithium ions comprises at least one member selected from the group consisting of elemental silicon, silicon oxide and carbon.

4. The lithium ion secondary battery according to claim 1, wherein the electrolytic liquid further comprises at least one solvent selected from the group consisting of a linear carbonate solvent and a cyclic carbonate solvent.

5. The lithium ion secondary battery according to claim 4, wherein the linear carbonate solvent comprises at least one solvent selected from the group consisting of dimethyl carbonate, ethyl methyl carbonate, and diethyl carbonate, and the cyclic carbonate solvent comprises at least one solvent selected from the group consisting of ethylene carbonate, propylene carbonate, and fluoroethylene carbonate.

6. The lithium ion secondary battery according to claim 1, wherein the amount of the fluorine-containing ether compound is 1% by volume to 90% by volume, based on the total volume of the electrolytic liquid.

* * * * *